US010473355B2

(12) United States Patent
O'Brien

(10) Patent No.: US 10,473,355 B2
(45) Date of Patent: Nov. 12, 2019

(54) SPLIT SYSTEM DEHUMIDIFIER

(75) Inventor: Timothy S. O'Brien, DeForest, WI (US)

(73) Assignee: Therma-Stor LLC, Madison, WI (US)

(*) Notice: Subject to any disclaimer, the term of this patent is extended or adjusted under 35 U.S.C. 154(b) by 1619 days.

(21) Appl. No.: 13/110,465

(22) Filed: May 18, 2011

(65) Prior Publication Data
US 2012/0291463 A1 Nov. 22, 2012

(51) Int. Cl.
F24F 12/00 (2006.01)

(52) U.S. Cl.
CPC .................. F24F 12/006 (2013.01)

(58) Field of Classification Search
CPC ...... F25B 49/00; F25B 2700/02; F25D 17/04; F25D 17/06; F24F 3/14; F24F 3/147; F24F 3/1405; F24F 3/153; F24F 1/02; F24F 11/0015; F24F 2003/1452; F24F 11/0012; F24F 2003/144; F24F 12/006; F24F 2003/1446; G05D 22/02; Y02B 30/563
USPC ....... 62/173, 176.6, 272, 427, 428; 165/223, 165/225, 228; 236/44 R, 44 A, 44 C
See application file for complete search history.

(56) References Cited

U.S. PATENT DOCUMENTS

| 2,172,877 | A | | 9/1939 | Parcaro | |
|---|---|---|---|---|---|
| 3,264,840 | A | | 8/1966 | Harnish | |
| 3,547,348 | A | * | 12/1970 | Kruper | 236/44 B |
| 4,761,966 | A | * | 8/1988 | Stark | F24F 3/1405 236/44 C |
| 4,984,433 | A | * | 1/1991 | Worthington | F24F 3/153 62/176.5 |
| 5,622,057 | A | | 4/1997 | Bussjager et al. | |
| 5,816,315 | A | * | 10/1998 | Stark | F24F 3/1405 165/166 |
| 5,913,360 | A | * | 6/1999 | Stark | F24F 3/1405 165/103 |
| 6,131,653 | A | * | 10/2000 | Larsson | F24F 3/14 165/224 |

(Continued)

OTHER PUBLICATIONS

Temperature-Moisture Relationship, Professor Michael Jenkins, Free Online Course Materials, USU OpenCourseWare, 2008.*

(Continued)

Primary Examiner — Christopher R Zerphey
Assistant Examiner — Schyler S Sanks
(74) Attorney, Agent, or Firm — Baker Botts L.L.P.

(57) ABSTRACT

A split-system dehumidifier includes an evaporator unit, a heat exchange unit, and a supply fan located inside a structure, and a remote condenser system located outside the structure. The evaporator unit receives a pre-cooled airflow and a flow of refrigerant, and generates a cooled airflow by facilitating heat transfer from the pre-cooled airflow to the flow of refrigerant. The heat exchange unit receives the cooled airflow generated by the evaporator unit and an incoming airflow from within the structure, and generates the pre-cooled airflow by facilitating heat transfer from the incoming airflow to the cooled airflow. The heat transfer transforms the received cooled airflow into an outgoing airflow having a relative humidity less than a relative humidity of the cooled airflow. The supply fan provides the outgoing airflow to inside the structure. The remote condenser system uses ambient air from outside the structure to cool the flow of refrigerant.

8 Claims, 5 Drawing Sheets

(56) References Cited

U.S. PATENT DOCUMENTS

| | | | | |
|---|---|---|---|---|
| 6,826,921 | B1* | 12/2004 | Uselton | F24F 3/153<br>62/160 |
| 7,194,870 | B1* | 3/2007 | O'Brien et al. | 62/292 |
| 7,228,693 | B2* | 6/2007 | Helt | 62/176.6 |
| 7,246,503 | B1* | 7/2007 | O'Brien et al. | 62/272 |
| 7,281,389 | B1* | 10/2007 | O'Brien et al. | 62/272 |
| 7,849,709 | B2* | 12/2010 | Takada | F24F 1/0007<br>62/180 |
| 8,069,681 | B1* | 12/2011 | Cink | F24F 3/1405<br>62/176.1 |
| 2004/0123616 | A1* | 7/2004 | Lee et al. | 62/271 |
| 2004/0134211 | A1* | 7/2004 | Lee et al. | 62/271 |
| 2006/0086112 | A1* | 4/2006 | Bloemer et al. | 62/176.6 |
| 2006/0255164 | A1* | 11/2006 | Oppermann et al. | 236/44 C |
| 2006/0260332 | A1* | 11/2006 | Matsui et al. | 62/94 |
| 2007/0033957 | A1* | 2/2007 | Taras | F16H 9/20<br>62/183 |
| 2008/0003940 | A1* | 1/2008 | Haglid | F24F 3/14<br>454/228 |
| 2008/0022705 | A1* | 1/2008 | Clearman | F24F 3/1405<br>62/173 |
| 2008/0173035 | A1* | 7/2008 | Thayer | F24F 3/153<br>62/173 |
| 2008/0307803 | A1* | 12/2008 | Herzon | F24F 3/147<br>62/93 |
| 2009/0165485 | A1* | 7/2009 | Stark | F24F 3/153<br>62/272 |
| 2010/0212334 | A1* | 8/2010 | DeMonte et al. | 62/93 |
| 2010/0275630 | A1* | 11/2010 | DeMonte | F24F 1/04<br>62/272 |

OTHER PUBLICATIONS

The Pressure-Enthalpy Chart, Dave Demma, Supermarket Refrigeration, Jan. 2005.*
Portable Dehumidifiers, http://www.sylvane.com/dehumidifiers.html, downloaded, May 18, 2011.
Mini-Split Systems, http://www.ductlessdepot.net/, May 18, 2011.
Daikin Quaternity Mini-Split, http://www.daikinac.com/residential/productsUnits20.asp?sec=products&page=55, May 18, 2011.
Vital Air (last vestige of Dumont), http://www.vital-air.com/, May 18, 2011.
Lennox Humiditrol, http://www.lennox.com/products/indoor-air-quality-systems/HD/, May 18, 2011.
AAon, http://www.aaon.com/product.aspx?id=6, May 18, 2011.
Munters DryCool HD, http://www.munters.us/en/us/Products--Services/Dehumidification/Dehumidification/HCU-systems/?Product=B4763DB6-F455-4097-8E16-F96D6493CCD9, May 18, 2011.
Heat Pipe, http://www.heatpipe.com/, May 18, 2011.
Space Pak and Unico, http://www.spacepak.com/ and http://www.unicosystem.com/, May 18, 2011.

* cited by examiner

SPLIT SYSTEM DEHUMIDIFIER

TECHNICAL FIELD

This invention relates generally to dehumidification and more particularly to a split system dehumidifier.

BACKGROUND OF THE INVENTION

In certain situations, it is desirable to reduce the humidity of air within a structure. For example, humid air within a structure may foster liquid condensation and mold growth. As another example, excessive humidity can hinder the evaporation of perspiration from human skin, resulting in increased discomfort in hot environments. Accordingly, the need exists for effective and efficient systems for reducing the humidity of air within a structure. Systems for reducing the humidity of air within a structure, however, have proven inadequate in various respects.

SUMMARY OF THE INVENTION

According to embodiments of the present disclosure, disadvantages and problems associated with previous systems may be reduced or eliminated.

In certain embodiments, a system comprises an evaporator unit operable to receive an incoming airflow and a flow of refrigerant from an expansion device. The evaporator unit generates a cooled airflow by facilitating heat transfer from the incoming airflow to the flow of refrigerant. The cooled airflow has an absolute humidity less than an absolute humidity of the incoming airflow. The system further comprises a subcooler unit operable to receive the cooled airflow generated by the evaporator unit and the flow of refrigerant from a condenser unit located exterior to a structure. The subcooler unit generates an outgoing airflow by facilitating heat transfer from the flow of refrigerant to the cooled airflow, the outgoing airflow having a relative humidity less than a relative humidity of the cooled airflow. The system further comprises a supply fan operable to provide the outgoing airflow to the structure.

Certain embodiments of the present disclosure may avoid various drawbacks associated with dehumidification. Certain conventional dehumidifiers remove latent heat (e.g., moisture) from the air but add substantial sensible heat to the air before introducing the air back into a structure, thereby resulting in an overall increase in temperature within the structure. In warmer climates, these conventional dehumidifiers may increase the load on the cooling system of the structure and/or cause "hot spots" within the structure (as the air leaving the dehumidifier is hotter than the air received by the dehumidifier). In contrast, certain embodiments of the system of the present disclosure may be operable to dehumidify air without increasing the temperature of the air. As a result, the system of the present disclosure may either serve as the cooling system for a structure, or decrease the load on a separate cooling system for the structure. Accordingly, the system of the present disclosure may be suitable for dehumidifying air within a structure located in an area having a generally warm, humid climate.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
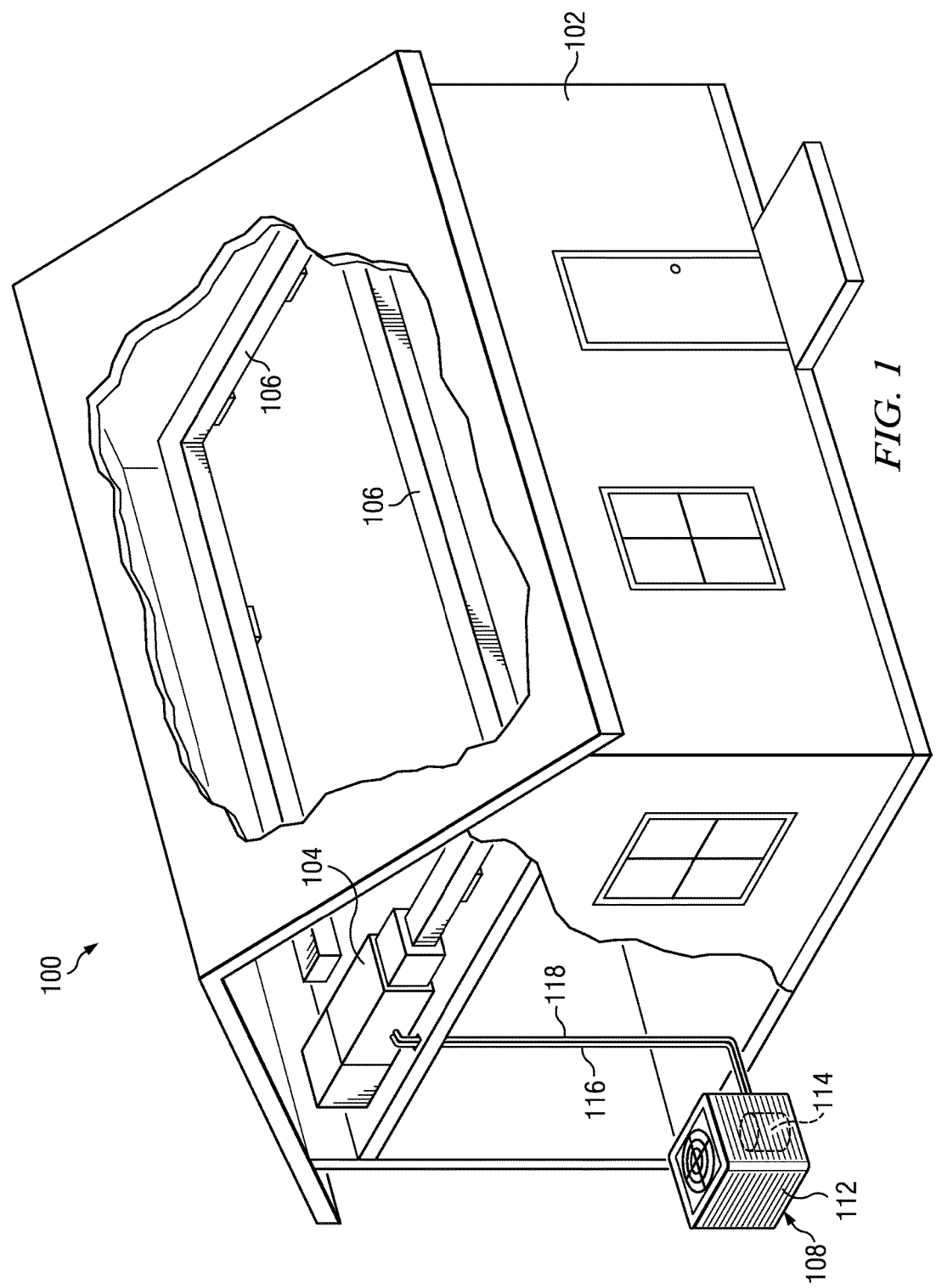
FIG. 1 illustrates an example system for supplying dehumidified air to a structure, according to certain embodiments of the present disclosure.

FIG. 1 illustrates an example system 100 for supplying dehumidified air to a structure 102, according to certain embodiments of the present disclosure. System 100 includes an evaporator system 104 located within structure 102. Structure 102 may include all or a portion of a building or other suitable enclosed space, such as an apartment building, a hotel, an office space, a commercial building, or a private dwelling (e.g., a house). Evaporator system 104 may be operable to receive air from within structure 102, reduce the moisture in the received air, and supply the dehumidified air back to the structure 102 at a temperature that is approximately the same or less than the temperature of the received air. Evaporator system 104 may distribute the dehumidified air throughout structure 102 via a supply duct 106. Alternative example evaporator systems are depicted and described in FIG. 2 (evaporator system 204), FIG. 3 (evaporator system 304), and FIG. 4 (evaporator system 404), and FIG. 5 (evaporator system 504).

System 100 may comprise a split system wherein evaporator system 104 is coupled to a remote condenser system 108 located external to structure 102. Remote condenser system 108 may comprise a condenser unit 112 and a compressor unit 114 that facilitate the functions of the evaporator system 104 by processing a flow of refrigerant as part of a refrigeration cycle. The flow of refrigerant may include any suitable cooling material, such as R410a refrigerant. In certain embodiments, compressor unit 114 may be operable to receive the flow of refrigerant from evaporator system 104 via refrigerant line 116. Compressor unit 114 may pressurize the flow of refrigerant, thereby increasing the temperature of the refrigerant. The speed of the compressor may be modulated to effectuate desired operating characteristics. Condenser unit 112 may receive the pressurized flow of refrigerant from compressor unit 114 and cool the pressurized refrigerant by facilitating heat transfer from the flow of refrigerant to the ambient air exterior to structure 102. In certain embodiments, condenser unit 108 may utilize a heat exchanger, such as a microchannel heat exchanger to remove heat from the flow of refrigerant. Condenser unit 108 may include a fan that draws ambient air from outside structure 102 for use in cooling the flow of refrigerant. In certain embodiments, the speed of this fan is modulated to effectuate desired operating characteristics.

After being cooled by condenser unit 108, the flow of refrigerant may travel by refrigerant line 118 to evaporator system 104. In certain embodiments, the flow of refrigerant may be received by an expansion device (described in further detail below) that is operable to reduce the pressure of the flow of refrigerant, thereby reducing the temperature of the flow of refrigerant. An evaporator unit (described in further detail below) of evaporator system 104 may receive the flow of refrigerant from the expansion device and use the flow of refrigerant to dehumidify and cool an incoming airflow. The flow of refrigerant may then flow back to remote condenser unit 108 and repeat this cycle.

In certain embodiments, evaporator system 104 may be installed in parallel with an air mover. An air mover may comprise a fan operable to blow air from one location to another. An air mover may facilitate distribution of outgoing air from evaporator system 104 to various parts of structure 102. An air mover and evaporator system 104 may have separate return inlets from which air is drawn. In certain embodiments, outgoing air from evaporator system 104 may be mixed with air produced by another component (e.g., an air conditioner) and blown through supply ducts 106 by the air mover. In other embodiments, evaporator system 104 may perform both cooling and dehumidifying and thus may be used without a conventional air conditioner.

Certain embodiments of the present disclosure avoid various drawbacks associated with dehumidification. In general, conventional dehumidifiers remove latent heat (e.g., moisture) from the air, but add substantial sensible heat to the air before introducing the air back into a structure 102, thereby resulting in an overall increase in temperature within the structure 102. In warmer climates, these conventional dehumidifiers may increase the load on the cooling system of the structure 102 and/or cause "hot spots" within the structure 102 (as the air leaving the dehumidifier is hotter than the air received by the dehumidifier). In certain embodiments, system 100 may be operable to dehumidify air without increasing the temperature of the air, thereby either (1) allowing system 100 to additionally serve as the cooling system for the structure 102, or (2) decreasing the load on a separate cooling system for the structure 102. Accordingly, system 100 may be suitable for dehumidifying air within a structure 102 located in an area having a generally warm, humid climate.

Although a particular implementation of system 100 is illustrated and primarily described, the present disclosure contemplates any suitable implementation of system 100, according to particular needs. Moreover, although various components of system 100 have been depicted as being located at particular positions, the present disclosure contemplates those components being positioned at any suitable location, according to particular needs.

Figure 2:
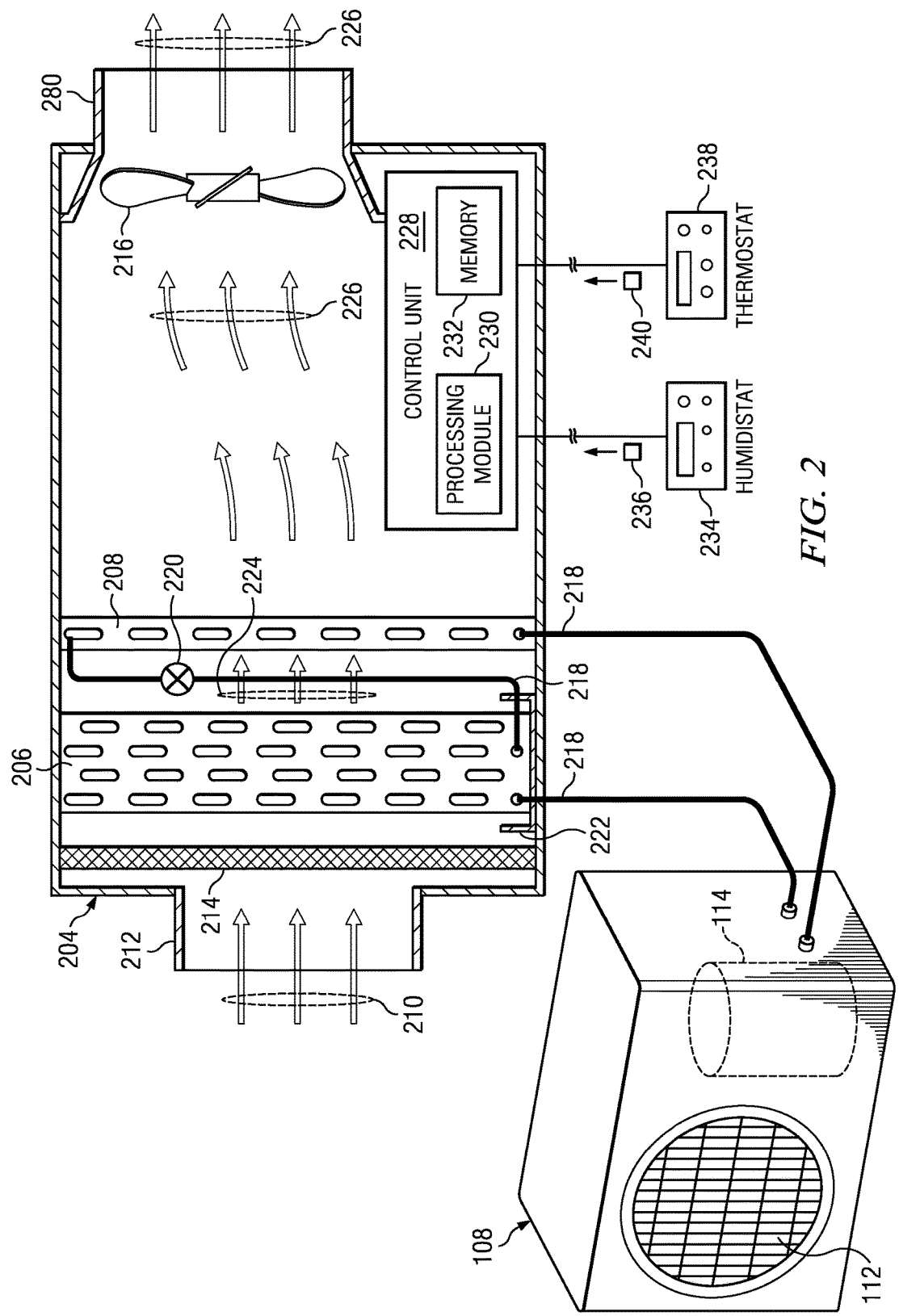
FIG. 2 illustrates a detailed view of an example evaporator system that utilizes an evaporator unit and a subcooler unit for supplying dehumidified air to a structure, according to certain embodiments of the present disclosure.

FIG. 2 illustrates a detailed view of an example evaporator system 204 that utilizes an evaporator unit 206 and a subcooler unit 208 for supplying dehumidified air to a structure 102, according to certain embodiments of the present disclosure. The present disclosure contemplates that evaporator system 204 may be one specific example configuration for the evaporator system 104 depicted in FIG. 1. As discussed above with regard to FIG. 1, system 204 may operate in conjunction with a remote condenser system 108 having a condenser unit 112 and a compressor unit 114, with refrigerant flowing to and from remote condenser system 108 via refrigeration lines 116 and 118.

In certain embodiments, evaporator unit 206 may be operable to receive an incoming airflow 210. Incoming airflow 210 may be drawn through return inlet 212 and air filter 214 by supply fan 216. Incoming airflow 210 may be drawn from any suitable source and may be composed of air from within structure 102, fresh air from outside of structure 102, or a mixture of the two. In certain embodiments, the composition of incoming airflow 210 may vary with time. Supply fan 216 may include any suitable component operable to draw incoming airflow 210 at a particular flow rate. For example, supply fan 216 may include a fan having a variable speed electric motor such that the flow rate of incoming airflow 210 may be varied by altering the speed of the electric motor. In certain embodiments, the speed of the electric motor of supply fan 216 may be adjusted manually (e.g., by a user). In certain other embodiments, the speed of the electric motor of supply fan 216 may be adjusted automatically, such as in response to a signal received from a controller, such as control unit 228 (described in further detail below). Supply fan 216 may be placed in any suitable location and is operable to draw air across or blow air through various components of evaporator system 204.

In certain embodiments, incoming airflow 210 may be drawn across evaporator unit 206, which may include an air-to-fluid heat exchanger that facilitates the transfer of heat from the incoming airflow 210 to a refrigerant flow 218. Evaporator unit 206 may be operable to receive refrigerant flow 218 from an expansion device 220. Expansion device 220 may be operable to receive refrigerant flow 218 from subcooler unit 208 and reduce the pressure of the refrigerant flow 218, thereby reducing the temperature of the refrigerant flow 218. Because subcooler unit 208 may serve to reduce the temperature of refrigerant flow 218 before it reaches expansion device 220 (as described in further detail below), the temperature of the refrigerant flow 218 leaving expansion device 220 may be less than it would be if the expansion device received the refrigerant flow 218 directly from condenser unit 112. Refrigerant flow 218 may be circulated through evaporator unit 206 in any suitable manner, including circulation through one or more tubes, pipes, or coils of evaporator unit 206. While the refrigerant flow is circulated through evaporator unit 206, supply fan 216 may draw incoming airflow 210 from return inlet 212 across evaporator unit 206.

As incoming airflow 210 is drawn across evaporator unit 206, heat from incoming airflow 210 transfers into the cooler refrigerant flow 218, causing a decrease in temperature of the incoming airflow 210. As the temperature of the incoming airflow 210 decreases, the ability of the incoming airflow 210 to retain moisture decreases. As a result, water vapor of the incoming airflow 210 may condense (e.g., into drain pan 222), thereby lowering the absolute humidity (i.e., the quantity of water in a particular volume of air) of incoming airflow 210. Because subcooler unit 208 may cause the refrigerant flow 218 leaving expansion device 220 (and received by evaporator unit 206) to have a lower temperature than it otherwise would (as described above), subcooler unit 208 may allow for greater heat transfer away from incoming airflow 210, thereby allowing for a greater decrease in absolute humidity.

This interaction of incoming airflow 210 with evaporator unit 206 generates a cooled airflow 224 that has a lower temperature and absolute humidity than that of incoming airflow 210. The cooled airflow 224 exits evaporator unit 206 and is drawn by supply fan 216 across subcooler unit 208.

In certain embodiments, subcooler unit 208 may include a fluid-to-air heat exchanger that facilitates the transfer of heat from refrigerant flow 218 to the cooled airflow 224 that is drawn across subcooler unit 208 by supply fan 216. Subcooler unit 208 may receive refrigerant flow 218 from condenser unit 112 via refrigerant line 118. The temperature of the refrigerant flow 218 may be at or near the temperature of the ambient air exterior to structure 102 (as the ambient air may be used by condenser unit 112 to cool the flow of refrigerant after it leaves compressor unit 114). The received refrigerant flow 218 may be circulated through subcooler unit 208, in any suitable manner, including circulation through one or more tubes, pipes, or coils of subcooler unit 208. As cooled airflow 224 generated by evaporator unit 206 is drawn across subcooler unit 208, heat may be transferred from the warmer refrigerant flow 218 to the cooler cooled airflow 224. As a result, subcooler unit 208 may serve to (1) cool the refrigerant flow 218 prior to its reception at expansion device 220, and (2) "re-heat" the cooled airflow 224 to generate an outgoing airflow 226.

By cooling the refrigerant flow 218 prior to its reception at expansion device 220, subcooler unit 208 may allow for greater heat transfer away from incoming airflow 210 at evaporator unit 206 (as described above). Additionally, by "re-heating" the cooled airflow 224, the generated outgoing airflow 226 may have a relative humidity that is less than the relative humidity of the cooled airflow 224. In general, relative humidity is defined as the ratio of the partial pressure of water vapor in a mixture of air and water vapor to the saturated vapor pressure of water at a prescribed temperature. Thus, if the amount of water in the air is held constant, and the temperature of the air rises, the relative humidity of the air will fall.

In certain embodiments, one or more components of evaporator system 204 (e.g., supply fan 216) may be coupled to a control unit 228 operable to selectively control the above-discussed operation of those components. Control unit 228 may be located in any suitable location, such as within evaporator system 204 or a component thereof, or within structure 102. Control unit 228 may include one or more components at one or more locations. For example, control unit 228 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, control unit 228 may include any suitable combination of software, firmware, and hardware.

Control unit 228 may additionally include one or more processing modules 230. Processing modules 230 may each include one or more microprocessors, controllers, or any other suitable computing devices or resources and may work, either alone or with other components of system 204, to provide a portion or all of the functionality of system 204 described herein. Control unit 228 may additionally include (or be communicatively coupled to via wireless or wireline communication) memory 232. Memory 232 may include any memory or database module and may take the form of volatile or non-volatile memory, including, without limitation, magnetic media, optical media, random access memory (RAM), read-only memory (ROM), removable media, or any other suitable local or remote memory component.

In certain embodiments, control unit 228 may be operative to selectively control one or more components of system 204. As an example, control unit 228 may be operative to control the speed of supply fan 216. Control unit 228 may control the speed of supply fan 216 in response to one or more received signals (e.g., from a humidistat 234 and/or a thermostat 236, described below) indicative of a temperature, humidity, water removal rate, system efficiency (e.g., energy efficiency), sensible heat ratio, or other operating condition of system 204 or a component thereof. For example, control unit 228 may be operable to control the speed of supply fan 216 such that system 204 achieves a desired temperature, humidity, water removal rate, system efficiency (e.g., energy efficiency), sensible heat ratio, or other operating condition of system 204 or a component thereof.

In certain embodiments, controller 228 may be integrated with (or configured to communicate with via wireless or wireline communication) one or more humidistats 234, which may be placed at one or more locations within structure 102 and/or evaporator system 204. Each humidistat 234 may comprise one or more devices operable to measure a humidity (e.g., absolute or relative). For example, a humidistat 234 may comprise a hygrometer or other suitable device operable to measure a humidity of the ambient air surrounding the thermostat.

In certain embodiments, a humidistat 234 may generate a signal 236 corresponding to a humidity of structure 102. Signal 236 may be received by control unit 228. Control unit 228 may be operable to determine (e.g., using any suitable logic), based on the received signal, whether to engage or disengage the supply fan. For example, control unit 228 may be operable to stop the supply of incoming airflow 210 to evaporator unit 206 (e.g., by disengaging supply fan 216) when the humidity within structure 102 drops below a lower limit (e.g., 40% relative humidity). In certain embodiments, control unit 228 may disengage supply fan 216 by communicating a signal to the supply fan to cause the supply fan to turn off. Additionally, control unit 228 may be operable to resume the supply of incoming air 210 to evaporator unit 204 (e.g., by engaging supply fan 216) when the humidity within structure 102 rises above an upper limit (e.g., 50% relative humidity). Control unit 228 may engage supply fan 216 by communicating a signal to supply fan 216 to cause the supply fan to turn on. In certain embodiments, the lower limit and upper limit of humidity may be stored in memory 232. As a result, control unit 228 may operate to maintain a humidity of structure 102 within a suitable range.

In certain embodiments, control unit 228 may be operable to modulate the speed of the supply fan 216 based on an absolute humidity of cooled airflow 224. For example, control unit 228 may receive an indication of an absolute humidity of cooled airflow 224 from a humidistat 234 located within evaporator system 204. As another example, control unit 228 may receive an indication of an amount of water collected in drain pan 222 over a given period of time. As another example, control unit 228 may receive an indication of a difference in absolute humidity between incoming airflow 210 and cooled airflow 224. In response to any of these indications, control unit 228 may be operable to modulate the speed of the supply fan 216 to increase or decrease the rate of water removal from incoming airflow 210.

In certain embodiments, controller 228 may be integrated with (or configured to communicate with via wireless or wireline communication) one or more thermostats 238, which may be placed at any suitable locations within structure 102, and/or evaporator system 204. Each thermostat 238 may comprise one or more devices operable to measure a temperature. For example, a thermostat 238 may comprise a thermometer or other suitable device operable to measure a temperature of the ambient air surrounding the thermostat.

In certain embodiments, thermostat 238 may generate a signal 240 corresponding to a temperature of structure 102. Signal 240 may be received by control unit 228. Control unit 228 may be operable to determine (e.g., using any suitable logic), based on the received signal 240, whether to engage or disengage the supply fan 216. For example, control unit 228 may be operable to stop the supply of incoming airflow 210 to evaporator unit 206 (e.g., by disengaging supply fan 216) when the air temperature within structure 102 drops below a lower limit (e.g., 70 degrees Fahrenheit). Control unit 228 may disengage supply fan 216 by communicating a signal to the supply fan to cause the supply fan to turn off. Additionally, control unit 228 may be operable to resume the supply of incoming air 210 to evaporator unit 204 (e.g., by engaging supply fan 216) when the air temperature within structure 102 rises above an upper limit (e.g., 80 degrees Fahrenheit). In certain embodiments, control unit 228 may engage the supply fan by communicating a signal to supply fan 216 to cause the supply fan to turn on. The lower limit and upper limit of temperature may be stored in memory 232. As a result, control unit 228 may operate to maintain an air temperature of structure 102 within a suitable range.

In certain embodiments, control unit 228 may be operable to modulate the speed of the supply fan 216 to achieve a desired sensible heat ratio. In general, a sensible heat ratio is expressed as a sensible cooling load (the energy consumed to reduce air temperature) divided by the total cooling load (the energy consumed to reduce air temperature and dehumidify the air). Thus, a system that primarily removes moisture (rather than cools) will have a relatively low SHR. Control unit 228 may be operable to calculate an SHR of evaporator system 204 and adjust the speed of supply fan 216 to achieve the desired SHR.

Figure 3:
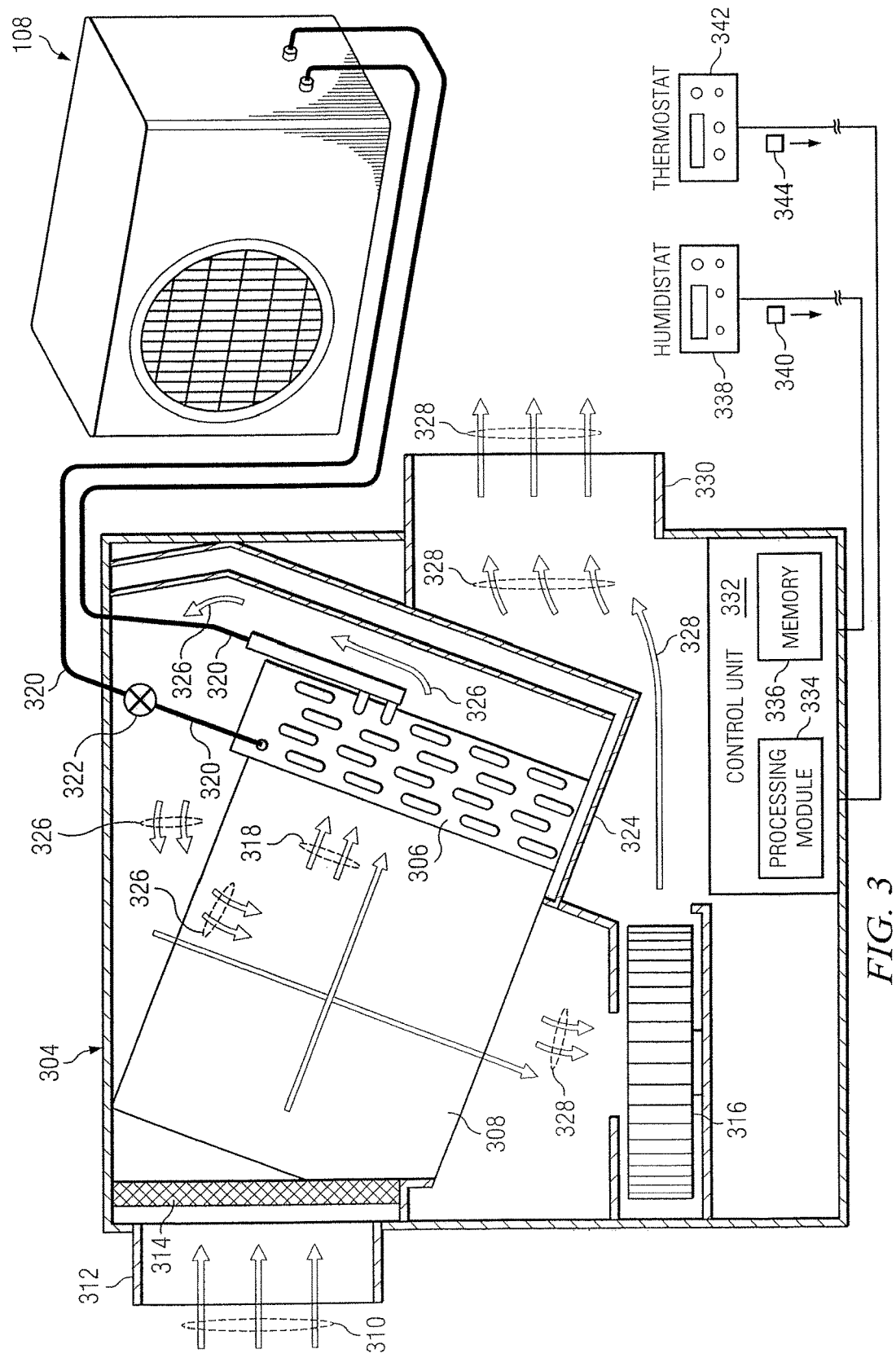
FIG. 3 illustrates a detailed view of an example evaporator system that utilizes an evaporator unit and a heat exchanger for supplying dehumidified air to a structure, according to certain embodiments of the present disclosure.

FIG. 3 illustrates a detailed view of an example evaporator system 304 that utilizes an evaporator unit 306 and a heat exchanger 308 for supplying dehumidified air to a structure 102, according to certain embodiments of the present disclosure. The present disclosure contemplates that evaporator system 304 may be one specific example configuration for the evaporator system 104 depicted in FIG. 1. As discussed above with regard to FIG. 1, system 304 may operate in conjunction with a remote condenser system 108 having a condenser unit 112 and a compressor unit 114, with refrigerant flowing to and from remote condenser system 108 via refrigeration lines 116 and 118.

In certain embodiments, heat exchanger 308 may be operable to receive an incoming airflow 310. Incoming airflow 310 may be drawn through return inlet 312 and air filter 314 by supply fan 316 (which may be substantially similar to supply fan 216 described above with regard to FIG. 2). Incoming airflow 310 may be drawn from any suitable source and may be composed of air from within structure 102, fresh air from outside of structure 102, or a mixture of the two. In certain embodiments, the composition of incoming airflow 310 may vary with time. Heat exchanger 308 may be an air-to-air heat exchanger operable to facilitate the transfer of heat from incoming airflow 310 to the cooled airflow 326 exiting evaporator unit 306 (described below) to generate a pre-cooled airflow 318.

In certain embodiments, pre-cooled airflow 318 may be drawn across evaporator unit 306, which may include an air-to-fluid heat exchanger that facilitates the transfer of heat from the pre-cooled airflow 318 to a refrigerant flow 320. Evaporator unit 306 may be operable to receive refrigerant flow 320 from an expansion device 322. Expansion device 322 may be operable to receive refrigerant flow 320 from condenser unit 112 and reduce the pressure of the refrigerant flow 320, thereby reducing the temperature of the refrigerant flow 320. Refrigerant flow 320 may be circulated through evaporator unit 306 in any suitable manner, including circulation through one or more tubes, pipes, or coils of evaporator unit 306. While the refrigerant flow 320 is circulated through evaporator unit 306, supply fan 316 may draw pre-cooled airflow 318 across evaporator unit 306.

As pre-cooled airflow 318 is drawn across evaporator unit 306, heat from pre-cooled airflow 318 transfers into the cooler refrigerant flow 320, causing a further decrease in temperature of the pre-cooled airflow 318. As the temperature of the pre-cooled airflow 318 decreases, the ability of the airflow to retain moisture decreases. As a result, water vapor of the airflow may condense (e.g., into drain pan 324), thereby lowering the absolute humidity (i.e., the quantity of water in a particular volume of air) of pre-cooled airflow 318. Because heat exchanger 308 may decrease the temperature of the incoming airflow 310 prior to the airflow reaching evaporator unit 306, the airflow exiting evaporator unit 306 (i.e., cooled airflow 326) may have a lower temperature than would be possible without heat exchanger 308. This lower temperature may allow for a greater decrease in absolute humidity of incoming airflow 310.

This interaction of pre-cooled airflow 318 with evaporator unit 306 generates a cooled airflow 326 that has a lower temperature and absolute humidity than incoming airflow 310 and pre-cooled airflow 318. The cooled airflow 326 exits evaporator unit 306 and is drawn by supply fan 316 through heat exchanger 308. As cooled airflow 326 passes through heat exchanger 308, cooled airflow 326 absorbs heat from incoming airflow 310 (as discussed above). This heat absorption causes an increase in temperature of cooled airflow 326 such that the outgoing airflow 328 exiting heat exchanger 308 has a lower relative humidity than the cooled airflow 326. The outgoing airflow 328 is provided to the structure 102 via supply outlet 330.

Use of heat exchanger 308 to "pre-cool" incoming airflow 310 and to "re-heat" cooled airflow 326 exiting evaporator unit 306 may increase the efficiency of evaporator system 304. For example, because the incoming airflow 310 is pre-cooled, the air exiting evaporator unit 306 may have a lower temperature and/or lower absolute humidity than if incoming airflow 310 were fed directly to evaporator unit 306. Additionally, by increasing the temperature of cooled airflow 326, the outgoing airflow 328 may have a lower relative humidity.

In certain embodiments, one or more components of evaporator system 304 (e.g., supply fan 316) may be coupled to a control unit 332 operable to selectively control the above-discussed operation of those components. Control unit 332 may, may be substantially similar to control unit 228 described above with regard to FIG. 2 (e.g., one or more processing modules 334 and one or more memory modules 336 of control unit 332 may be substantially similar to processing modules 230 and memory 232).

In certain embodiments, control unit 332 may be operative to selectively control one or more components of system 304. For example, control unit 332 may be integrated with (or configured to communicate with via wireless or wireline communication) one or more humidistats 338 (which may be substantially similar to humidistats 234 described above with regard to FIG. 2). Additionally, control unit 332 may be integrated with (or configured to communicate with via wireless or wireline communication) one or more thermostats 342 (which may be substantially similar to thermostats 238 described above with regard to FIG. 2). Control unit 332 may be operable to receive signals 340 and 344 from humidistat(s) 338 and thermostat(s) 342, respectively. In response to those signals, control unit 332 may control the operation of one or more components of evaporator system 304 (e.g., supply fan 316) in a manner substantially similar to that described above with regard to control unit 228 of FIG. 2.

Figure 4:
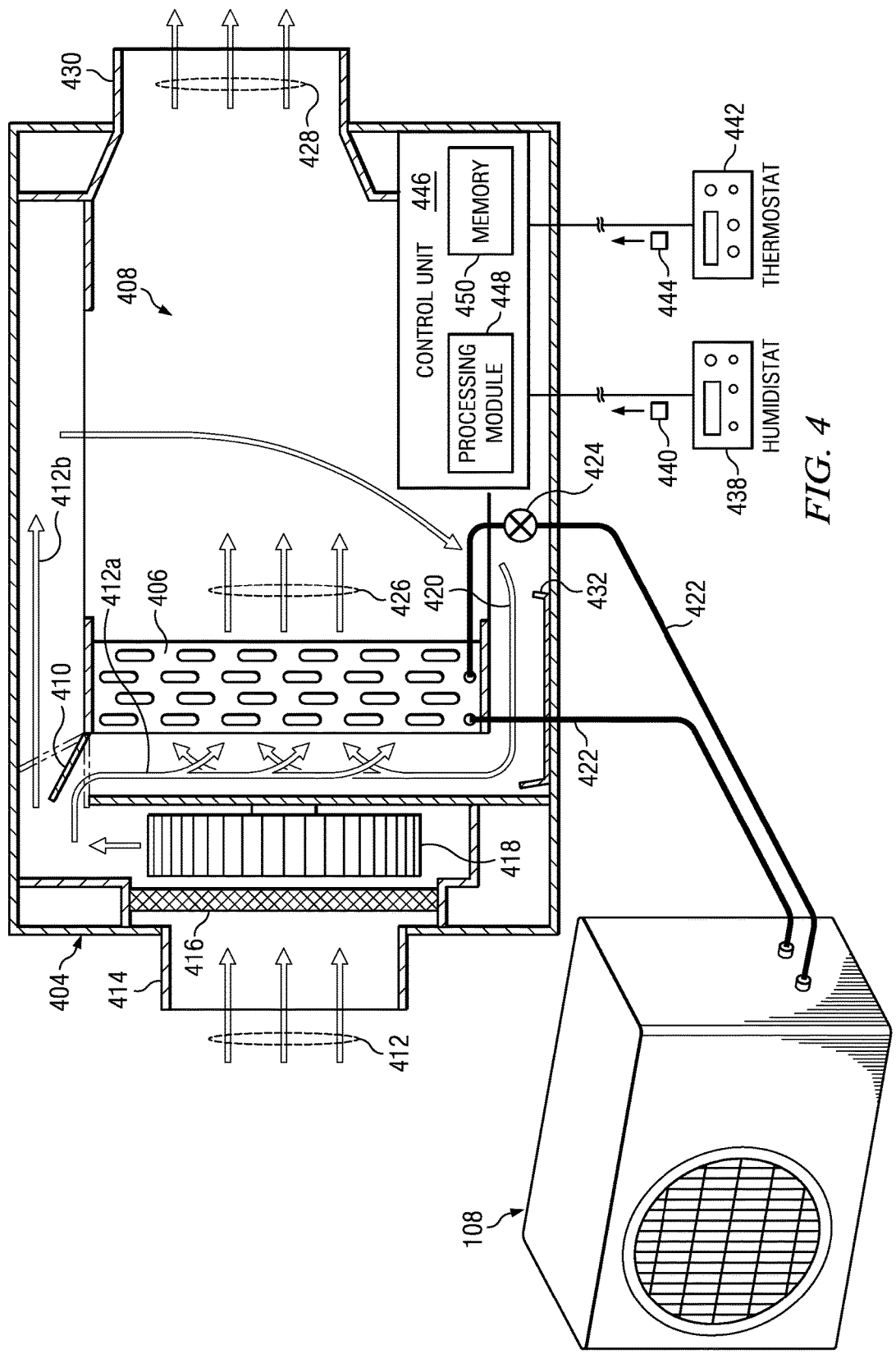
FIG. 4 illustrates a detailed view of an example evaporator system that utilizes an evaporator unit, a heat exchanger, and a bypass damper for supplying dehumidified air to a structure, according to certain embodiments of the present disclosure.

FIG. 4 illustrates a detailed view of an example evaporator system 404 that utilizes an evaporator unit 406, a heat exchanger 408, and a bypass damper 410 for supplying dehumidified air to a structure 102, according to certain embodiments of the present disclosure. The present disclosure contemplates that evaporator system 404 may be one specific example configuration for the evaporator system 104 depicted in FIG. 1. As discussed above with regard to FIG. 1, system 404 may operate in conjunction with a remote condenser system 108 having a condenser unit 112 and a compressor unit 114, with refrigerant flowing to and from remote condenser system 108 via refrigeration lines 116 and 118.

In certain embodiments, an incoming airflow 412 may be drawn through return inlet 414 and air filter 416 by supply fan 418. Supply fan 418 may be substantially similar to supply fan 216 described above with respect to FIG. 2. Incoming airflow 412 may be drawn from any suitable source and may be composed of air from within structure 102, fresh air from outside of structure 102, or a mixture of the two. In certain embodiments, the composition of incoming airflow 412 may vary with time.

In certain embodiments, bypass damper 410 may be operable to receive incoming airflow 412 and separate it into a first portion 412a and a second portion 412b. Bypass damper 410 may be any suitable component operable to separate an airflow into at least two portions. Bypass damper 410 may be adjustable (e.g., in response to a signal from control unit 446, described below) such that the amount of air from incoming airflow 412 that is allocated to the first portion 412a or the second portion 412b may be changed according to the position of bypass damper 410.

In certain embodiments, heat exchanger 408 may be operable to receive second portion 412b of incoming airflow 412. Heat exchanger 408 may be an air-to-air heat exchanger operable to facilitate the transfer of heat from second portion 412b of incoming airflow 412 to the cooled airflow 426 exiting evaporator unit 406 (described below) to generate a pre-cooled airflow 420.

In certain embodiments, pre-cooled airflow 420 may be mixed with first portion 412a of incoming airflow 412, and the mixture may be drawn across evaporator unit 406. Evaporator unit 406 may include an air-to-fluid heat exchanger that facilitates the transfer of heat from the mixed airflow to a refrigerant flow 422. Evaporator unit 406 may be operable to receive refrigerant flow 422 from an expansion device 424. Expansion device 424 may be operable to receive refrigerant flow 422 from condenser unit 112 and reduce the pressure of the refrigerant flow 422, thereby reducing the temperature of the refrigerant flow 422. Refrigerant flow 422 may be circulated through evaporator unit 406 in any suitable manner, including circulation through one or more tubes, pipes, or coils of evaporator unit 406. While the refrigerant flow 422 is circulated through evaporator unit 406, supply fan 418 may draw the mixed airflow across evaporator unit 406.

As the mixed airflow is drawn across evaporator unit 406, heat from the mixed airflow transfers into the cooler refrigerant flow 422, causing a decrease in temperature of the mixed airflow. As the temperature of the mixed airflow decreases, the ability of the airflow to retain moisture decreases. As a result, water vapor of the airflow may condense (e.g., into drain pan 432), thereby lowering the absolute humidity (i.e., the quantity of water in a particular volume of air) of the mixed airflow. Because heat exchanger 408 may decrease the temperature of the second portion 412b of incoming airflow 412 prior to that portion of the airflow reaching evaporator unit 406, the airflow exiting evaporator unit 406 (i.e., cooled airflow 426) may have a lower temperature than would be possible without heat exchanger 408 (the magnitude of the temperature decrease depending on the division of incoming airflow 412 by bypass damper 410). This lower temperature may allow for a greater decrease in absolute humidity of incoming airflow 412.

This interaction of the mixed airflow with evaporator unit 406 generates a cooled airflow 426 that has a lower temperature and absolute humidity than incoming airflow 412 and pre-cooled airflow 420. The cooled airflow 426 exits evaporator unit 406 and is drawn by supply fan 418 through heat exchanger 408. As cooled airflow 426 passes through heat exchanger 408, cooled airflow 426 absorbs heat from second portion 412b of incoming airflow 412 (as discussed above). This heat absorption causes an increase in temperature of cooled airflow 426 such that the outgoing airflow 428 exiting heat exchanger 408 has a lower relative humidity than the cooled airflow 426. The outgoing airflow 428 is provided to the structure 102 via supply outlet 430.

Use of heat exchanger 408 to "pre-cool" a portion of incoming airflow 412 and to "re-heat" cooled airflow 426 exiting evaporator unit 406 may increase the efficiency of evaporator system 404. For example, because a portion of the incoming airflow 412 is pre-cooled, the air exiting evaporator unit 406 may have a lower temperature and/or lower absolute humidity than if all of incoming airflow 412 were fed directly to evaporator unit 406. Additionally, by increasing the temperature of cooled airflow 426, the outgoing airflow 428 may have a lower relative humidity.

In certain embodiments, one or more components of evaporator system 404 (e.g., bypass damper 410 and supply fan 418) may be coupled to a control unit 446 operable to selectively control the above-discussed operation of those components. Control unit 446 may be substantially similar to control unit 228 described above with regard to FIG. 2 (e.g., one or more processing modules 448 and one or more memory modules 450 of control unit 446 may be substantially similar to processing modules 230 and memory 232).

In certain embodiments, control unit 446 may be operative to selectively control one or more components of system 404. For example, control unit 446 may be integrated with (or configured to communicate with via wireless or wireline communication) one or more humidistats 438 (which may be substantially similar to humidistats 234 described above with regard to FIG. 2). Additionally, control unit 446 may be integrated with (or configured to communicate with via wireless or wireline communication) one or more thermostats 442 (which may be substantially similar to thermostats 238 described above with regard to FIG. 2). Control unit 446 may be operable to receive signals 440 and 444 from humidistat(s) 438 and thermostat(s) 442, respectively. In response to those signals, control unit 446 may control the operation of supply fan 418 in a manner substantially similar to that described above with regard to control unit 228 of FIG. 2. Additionally or alternatively, control unit 446 may adjust bypass damper 410 in response to signals 440 and 444 from humidistat(s) 438 and thermostat(s) 442, respectively, to control the temperature, humidity, water removal rate, system efficiency (e.g., energy efficiency), sensible heat ratio, or other operating condition of system 404 or a component thereof.

Figure 5:
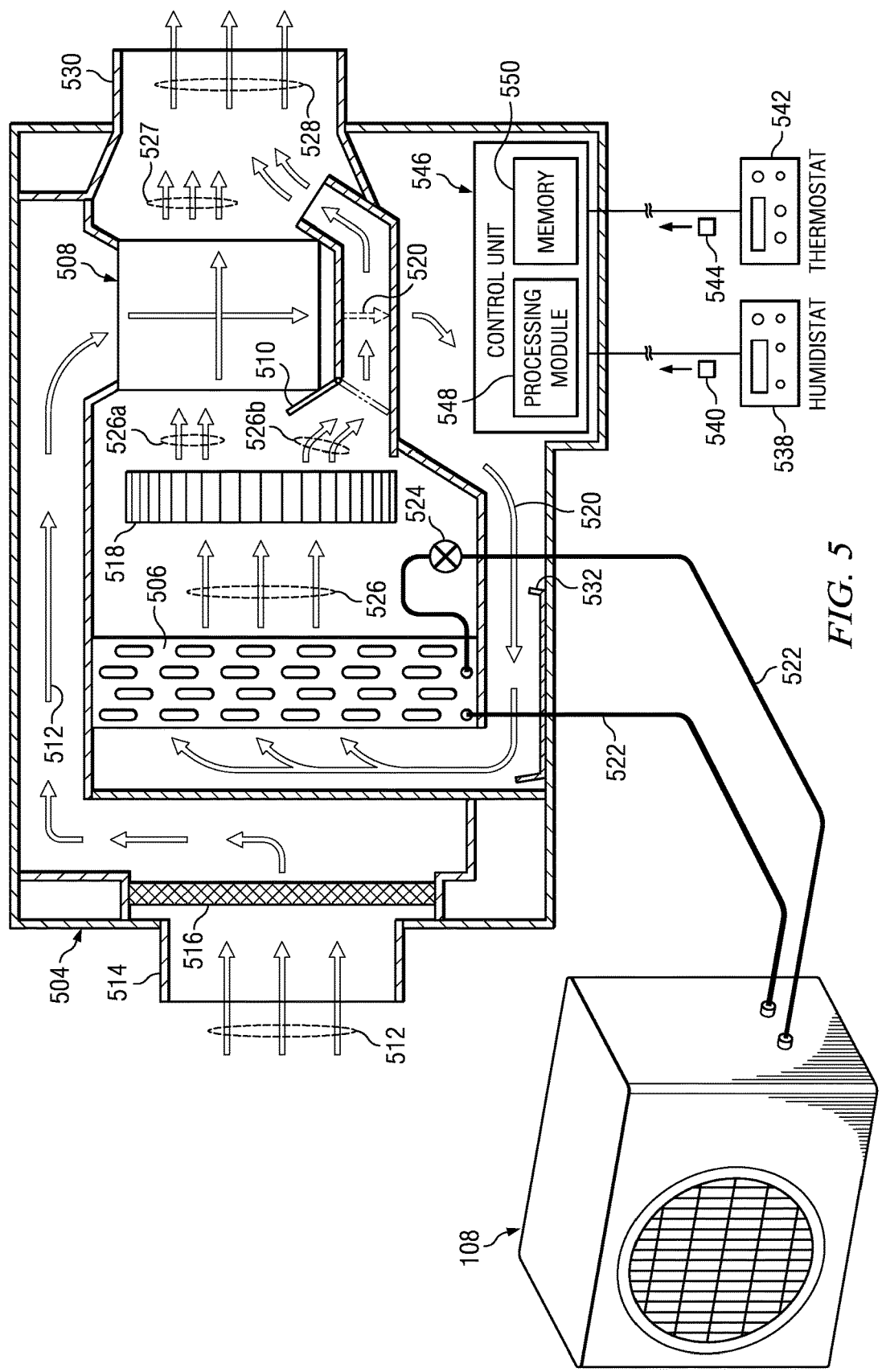
FIG. 5 illustrates a detailed view of an example evaporator system that utilizes an evaporator unit, a heat exchanger, and a bypass damper for supplying dehumidified air to a structure, according to certain embodiments of the present disclosure.

FIG. 5 illustrates a detailed view of an example evaporator system 504 that utilizes an evaporator unit 506, a heat exchanger 508, and a bypass damper 510 for supplying dehumidified air to a structure 102, according to certain embodiments of the present disclosure. The present disclosure contemplates that evaporator system 504 may be one specific example configuration for the evaporator system 104 depicted in FIG. 1. As discussed above with regard to FIG. 1, system 504 may operate in conjunction with a remote condenser system 108 having a condenser unit 112 and a compressor unit 114, with refrigerant flowing to and from remote condenser system 108 via refrigeration lines 116 and 118.

In certain embodiments, an incoming airflow 512 may be drawn through return inlet 514 and air filter 516 by supply fan 518. Supply fan 518 may be substantially similar to supply fan 216 described above with respect to FIG. 2. Incoming airflow 512 may be drawn from any suitable source and may be composed of air from within structure 102, fresh air from outside of structure 102, or a mixture of the two. In certain embodiments, the composition of incoming airflow 512 may vary with time.

In certain embodiments, heat exchanger 508 may be operable to receive the incoming airflow 512 and a first portion 526a of the cooled airflow 526 exiting evaporator unit 506 (as described below). Heat exchanger 508 may be an air-to-air heat exchanger operable to facilitate the transfer of heat from incoming airflow 512 to the first portion 526a of the cooled airflow 526 to generate a pre-cooled airflow 520.

In certain embodiments, pre-cooled airflow 520 may then be drawn across evaporator unit 506 by supply fan 518. Evaporator unit 506 may include an air-to-fluid heat exchanger that facilitates the transfer of heat from the pre-cooled airflow 520 to a refrigerant flow 522. Evaporator unit 506 may be operable to receive refrigerant flow 522 from an expansion device 524. Expansion device 524 may be operable to receive refrigerant flow 522 from condenser unit 112 and reduce the pressure of the refrigerant flow 522, thereby reducing the temperature of the refrigerant flow 522. Refrigerant flow 522 may be circulated through evaporator unit 506 in any suitable manner, including circulation through one or more tubes, pipes, or coils of evaporator unit 506. While the refrigerant flow 522 is circulated through evaporator unit 506, supply fan 518 may draw the pre-cooled airflow 520 across evaporator unit 506.

As the pre-cooled airflow 520 is drawn across evaporator unit 506, heat from the pre-cooled airflow 520 transfers into the cooler refrigerant flow 522, causing a decrease in temperature of the pre-cooled airflow. As the temperature of the pre-cooled airflow decreases, the ability of the airflow to retain moisture decreases. As a result, water vapor of the airflow may condense (e.g., into drain pan 532), thereby lowering the absolute humidity (i.e., the quantity of water in a particular volume of air) of the mixed airflow. Because heat exchanger 508 may decrease the temperature of incoming airflow 512 before it reaches evaporator unit 506, the airflow exiting evaporator unit 506 (i.e., cooled airflow 526) may have a lower temperature than would be possible without heat exchanger 508 (the magnitude of the temperature decrease depending on the division of cooled airflow 526 by bypass damper 510, as discussed below). This lower temperature may allow for a greater decrease in absolute humidity of incoming airflow 512.

This interaction of the pre-cooled airflow 520 with evaporator unit 506 generates a cooled airflow 526 that has a lower temperature and absolute humidity than incoming airflow 512 and pre-cooled airflow 520. The cooled airflow 526 exits evaporator unit 506 and received by bypass damper 510.

In certain embodiments, bypass damper 510 may be operable to partition the cooled airflow 526 into a first portion 526a and a second portion 526b. Bypass damper 510 may be any suitable component operable to separate an airflow into at least two portions. Bypass damper 510 may be adjustable (e.g., in response to a signal from control unit 546, described below) such that the amount of air from cooled airflow 526 that is allocated to the first portion 526a or the second portion 526b may be changed according to the position of bypass damper 510. As the portion of cooled airflow 526 allocated to the first portion 526a increases, the temperature of the pre-cooled airflow 520 may decrease.

The first portion 526a of the cooled airflow 526 is drawn by supply fan 518 through heat exchanger 508. As the first portion 526a of cooled airflow 526 passes through heat exchanger 508, the first portion 526a of cooled airflow 526 absorbs heat from incoming airflow 512 (as discussed above). This heat absorption causes an increase in temperature of the first portion 526a of cooled airflow 526, resulting in the generation of reheated airflow 527. Reheated airflow 527 exiting heat exchanger 508 has a lower relative humidity than that of the cooled airflow 526.

Reheated airflow 527 may then be mixed with the second portion 526b of cooled airflow 526, which bypasses heat exchanger 508, to generate outgoing airflow 528. Supply fan 526 operates to provide outgoing airflow 528 to the structure 102 via supply outlet 530.

Use of heat exchanger 508 to "pre-cool" incoming airflow 512 and to "re-heat" the first portion 526a of cooled airflow 526 exiting evaporator unit 506 may increase the efficiency of evaporator system 504. For example, because incoming airflow 512 is pre-cooled, the air exiting evaporator unit 506 may have a lower temperature and/or lower absolute humidity than if incoming airflow 512 were fed directly to evaporator unit 506. Additionally, by increasing the temperature of the first portion 526a of cooled airflow 526, the outgoing airflow 528 may have a lower relative humidity than that of the cooled airflow 526.

In certain embodiments, one or more components of evaporator system 504 (e.g., bypass damper 510 and supply fan 518) may be coupled to a control unit 546 operable to selectively control the above-discussed operation of those components. Control unit 546 may be substantially similar to control unit 228 described above with regard to FIG. 2 (e.g., one or more processing modules 548 and one or more memory modules 550 of control unit 546 may be substantially similar to processing modules 230 and memory 232).

In certain embodiments, control unit 546 may be operative to selectively control one or more components of system 504. For example, control unit 546 may be integrated with (or configured to communicate with via wireless or wireline communication) one or more humidistats 538 (which may be substantially similar to humidistats 234 described above with regard to FIG. 2). Additionally, control unit 546 may be integrated with (or configured to communicate with via wireless or wireline communication) one or more thermostats 542 (which may be substantially similar to thermostats 238 described above with regard to FIG. 2). Control unit 546 may be operable to receive signals 540 and 544 from humidistat(s) 538 and thermostat(s) 542, respectively. In response to those signals, control unit 546 may control the operation of supply fan 518 in a manner substantially similar to that described above with regard to control unit 228 of FIG. 2. Additionally or alternatively, control unit 546 may adjust bypass damper 510 in response to signals 540 and 544 from humidistat(s) 538 and thermostat(s) 542, respectively, to control the temperature, humidity, water removal rate, system efficiency (e.g., energy efficiency), sensible heat ratio, or other operating condition of system 504 or a component thereof.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A split-system dehumidifier, comprising:
   an evaporator unit located inside a structure and operable to:
      receive a pre-cooled airflow;
      receive a flow of refrigerant; and
      generate a cooled airflow by facilitating heat transfer from the pre-cooled airflow to the flow of refrigerant;
   a heat exchange unit located inside the structure and operable to:
      receive the cooled airflow generated by the evaporator unit;
      receive an incoming airflow from within the structure; and
      generate the pre-cooled airflow from the incoming airflow by facilitating heat transfer from the incoming airflow to the cooled airflow, the heat transfer from the incoming airflow to the cooled airflow transforming the received cooled airflow into an outgoing airflow, wherein the outgoing airflow has a relative humidity less than a relative humidity of the cooled airflow and is warmer than the cooled airflow;
   a supply fan located inside the structure and positioned downstream of the evaporator unit and the heat exchange unit, the supply fan operable to provide the outgoing airflow to inside the structure, wherein the outgoing airflow is not being reheated as it is being provided to inside the structure;
   a remote condenser system located outside the structure and operable to use ambient air from outside the structure to cool the flow of refrigerant; and
   a control unit operable to modulate the speed of the supply fan based on a humidity within the structure such that the supply fan is stopped when the humidity drops below a lower limit.

2. The split-system dehumidifier of claim 1, wherein the evaporator unit receives the flow of refrigerant from an expansion device that is operable to:
   receive the flow of refrigerant from a condenser unit that is part of the remote condenser system; and
   reduce the pressure of the flow of refrigerant, thereby reducing the temperature of the flow of refrigerant.

3. The split-system dehumidifier of claim 1, further comprising a compressor unit that is part of the remote condenser system and operable to:
   receive the flow of refrigerant from the evaporator unit; and
   pressurize the flow of refrigerant.

4. The split-system dehumidifier of claim 3, further comprising a condenser unit that is part of the remote condenser system and operable to:
   receive the flow of refrigerant from the compressor unit; and
   cool the flow of refrigerant by facilitating heat transfer from the flow of refrigerant to ambient air outside the structure.

5. The split-system dehumidifier of claim 1, further comprising:
   a humidistat operable to generate a signal corresponding to the humidity within the structure; and
   the control unit is further operable to:
      receive the signal corresponding to the humidity within the structure from the humidistat; and
      determine, based on the received signal, whether to engage or disengage the supply fan.

6. The split-system dehumidifier of claim 1, further comprising:
   a thermostat operable to generate a signal corresponding to a temperature within the structure; and
   the control unit operable to:
      receive the signal corresponding to the temperature within the structure from the thermostat; and
      determine, based on the received signal, whether to engage or disengage the supply fan.

7. The split-system of dehumidifier of claim 1, wherein the control unit modulates the speed of the supply fan based on an absolute humidity of the cooled airflow such that the speed of the supply fan is reduced or the supply fan is stopped when the absolute humidity drops below a lower limit.

8. The split-system dehumidifier of claim 1, wherein the control unit is further operable to modulate the speed of the supply fan in order to achieve a desired sensible heat ratio.

* * * * *